United States Patent
Norton

(10) Patent No.: US 6,867,878 B1
(45) Date of Patent: Mar. 15, 2005

(54) SWATH HEIGHT COMPENSATION FOR LOSSLESS COMPRESSION OF PEN DATA

(75) Inventor: Kirkpatrick William Norton, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/444,150

(22) Filed: Nov. 20, 1999

(51) Int. Cl.⁷ .......................... G06F 15/00; B41J 2/145
(52) U.S. Cl. .......................... 358/1.16; 358/1.1; 347/40
(58) Field of Search .................................. 358/1.1, 1.13, 358/1.14–1.18; 347/12, 40; 345/12

(56) References Cited

U.S. PATENT DOCUMENTS

| | | |
|---|---|---|
| 5,331,427 A | 7/1994 | Namizuka |
| 5,442,459 A | 8/1995 | Gahang |
| 5,452,102 A | 9/1995 | Yokoyama et al. |
| 5,453,843 A | 9/1995 | Levy |
| 5,471,322 A | 11/1995 | Murata |
| 5,555,322 A | 9/1996 | Terrai et al. |
| 5,566,001 A | 10/1996 | Saidi et al. |
| 5,596,423 A | 1/1997 | Pritchard |
| 5,659,669 A * | 8/1997 | Narukawa et al. ........... 358/1.2 |
| 5,751,865 A | 5/1998 | Micco et al. |
| 5,923,820 A | 7/1999 | Cunnagin et al. |
| 5,970,221 A * | 10/1999 | Bolash et al. ............... 358/1.16 |
| 6,222,636 B1 * | 4/2001 | Gerstenberger ............. 358/1.15 |
| 6,247,786 B1 * | 6/2001 | Booth et al. .................. 347/40 |

* cited by examiner

*Primary Examiner*—Kimberly Williams
*Assistant Examiner*—Saeid Ebrahimi

(57) ABSTRACT

A printer includes an Application Specific Integrated Circuit ("ASIC") having an embedded printer controller and an embedded swath buffer for storing complete rows of compressed swath data. The embedded swath buffer may be a fraction of the size of a conventional swath buffer, which is not embedded and which does not store compressed swath data. A printer driver, resident in a host, transmits only complete rows of compressed swath data to the printer.

18 Claims, 3 Drawing Sheets

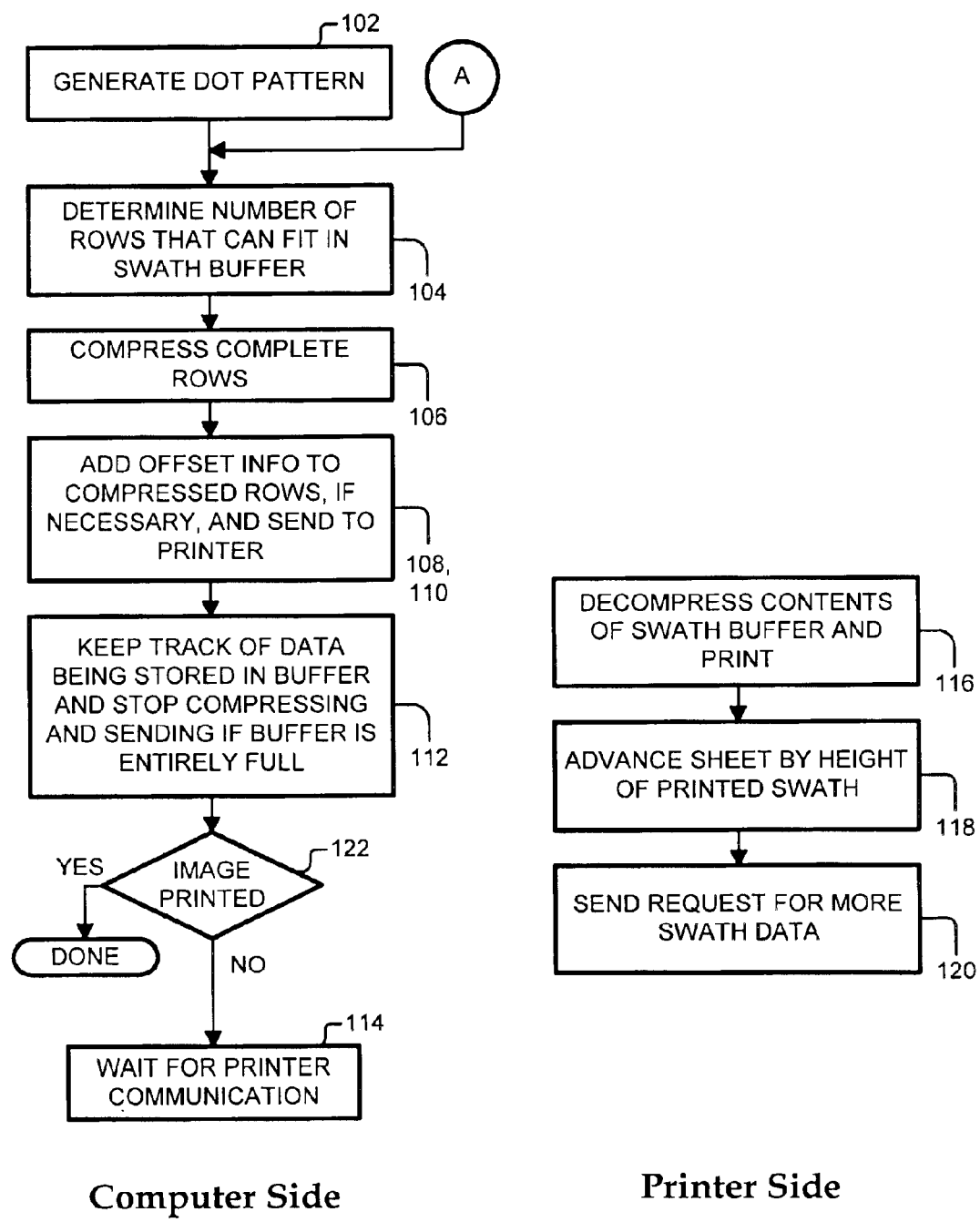

Host Side            Printer Side

SWATH HEIGHT COMPENSATION FOR LOSSLESS COMPRESSION OF PEN DATA

BACKGROUND OF THE INVENTION

The invention relates to inkjet printers. More specifically, the invention relates to the transmission of swath data from a host to a printer.

A typical tri-color printer includes a first pen for printing cyan-colored dots, a second pen for printing magenta-colored dots, and a third pen for printing yellow-colored dots. Each pen includes a plurality of vertically-oriented nozzles. When a nozzle is thermally actuated, it lays down a colored dot on a sheet of paper. During printing, the pens are moved across the sheet in tandem so as to allow multiple dot colors to be laid down. Each time the print head is moved across the sheet, a swath of dots is printed.

The nozzles are actuated according to swath data. Each bit of the swath data indicates whether a nozzle should be actuated at a specific position along the sheet.

The swath data is usually generated by a host, such as a personal computer, and transmitted to the printer. When received by the printer, the swath data is stored in a random access memory ("RAM") buffer. For a single pen having 100 nozzles and a 300 dot per inch ("dpi") printing resolution, a full 8" swath would include 240 K pixels. Storing data representing the full swath would require 30 K bytes of RAM. For higher resolutions, taller swaths, more pens and more nozzles per pen (for example, some pens have two columns of nozzles), memory requirements would be much greater.

To reduce the amount of data that is transmitted, the swath data may be compressed by the host, transmitted in compressed form, and decompressed by the printer. Decompression is performed on the fly, and uncompressed swath data is stored in the RAM buffer and used to actuate the nozzles during printing.

The typical inkjet printer includes a printed circuit board, an Application Specific Integrated Circuit ("ASIC") containing a printer controller, and a separate integrated circuit including the buffer. Among its functions, the printer controller decompresses the swath data and uses the uncompressed swath data to actuate the nozzles.

Each integrated circuit adds to the cost of the printer. Each integrated circuit has a separate package, each package is mounted to the circuit board, and each package takes up valuable real estate on the circuit board. Moreover, the buffer integrated circuit is a memory chip of a standard size, which is usually much larger than needed for buffering the uncompressed swath data.

It would be desirable to embed the buffer in the printer controller ASIC. Embedding the buffer would reduce the costs associated with an extra integrated circuit package.

However, embedding the buffer can increase the size and cost of the printer controller ASIC. Many printer controller ASICs are already core limited. Increasing the size of a core-limited ASIC would require die size of the ASIC to be increased. A significant increase in the die size would increase the cost of the printer controller ASIC.

It is an objective of the invention to reduce the buffer size in order to embed the buffer without significantly increasing the die size of the printer controller ASIC.

SUMMARY OF THE INVENTION

According to one aspect of the present invention, a printer includes a buffer for storing compressed swath data. The buffer has a data storage capacity of Z bytes, where $Z<Y$ and where Y is the number of bytes of uncompressed data representing a full swath. The printer further includes a printer controller for decompressing contents of the buffer.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 2 is an illustration of a method of generating, transmitting and printing a dot pattern;

DETAILED DESCRIPTION OF THE INVENTION

Figure 1:
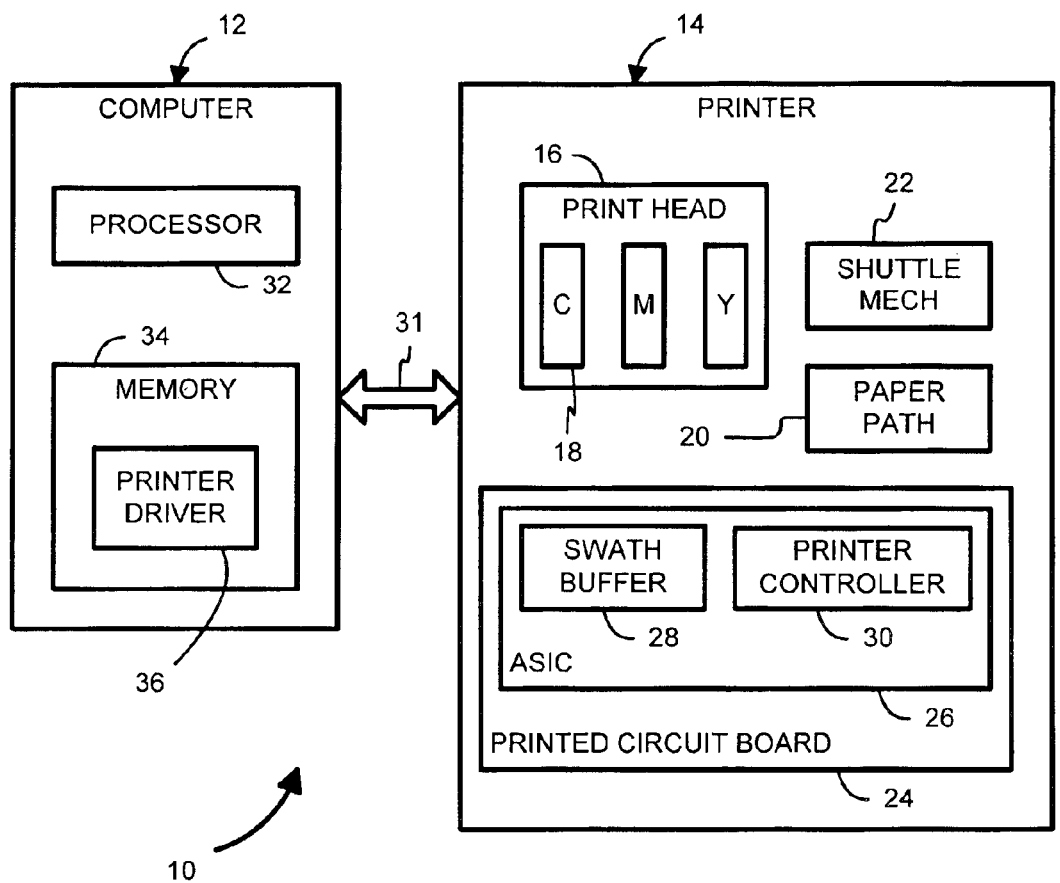
FIG. 1 is an illustration of a system including a computer and an ink-jet printer.

As shown in the drawings for purposes of illustration, the present invention is embodied in a system including a host computer and an inkjet printer. The printer includes an ASIC having a printer controller and a swath data buffer. Compressed swath data, which may be generated by the host computer, is transmitted to the printer and stored in the swath buffer. The printer controller decompresses the swath data on the fly, and the resulting uncompressed swath data is printed. Embedding the swath buffer on the ASIC is less expensive than providing the buffer in a separate package, provided that die size of the ASIC is not significantly increased. Compressing the data allows the buffer size to be a fraction of the size of a buffer storing uncompressed swath data. If the compressed data representing a full swath does not fit in the swath buffer, rows that were not printed in one swath can be printed in a subsequent swath. Consequently, print quality is not compromised. In addition to lowering printer costs, embedding the buffer increases speed at which the printer controller can access the compressed data.

FIG. 1 shows a computer system 10 including a host computer 12 and an inkjet printer 14. The printer 14 includes a print head 16 having at least one pen 18 for each printable color. The printable colors of a typical tri-color print head are cyan, magenta and yellow. Each pen 18 includes at least one column of nozzles. Each nozzle can be individually actuated to deposit a colored dot on a sheet. Within any space on a white sheet of paper, for example, a typical tri-color print head 16 can deposit dots of cyan, magenta and yellow ink in a combination that produces any one of the following eight colors: black, blue, red, green, magenta, cyan, yellow and white.

The printer 14 further includes a paper path 20 for advancing sheets through the printer 14 and a mechanism 22 (e.g., a stepper motor, rail and transmission) for shuttling the print head 16 across the sheets as the sheets are advanced through the printer 14. The printer 14 also includes a printed circuit board 24 and an ASIC 26 mounted to the printed circuit board 24. The ASIC 26 includes an embedded swath data buffer 28 for storing compressed swath data and a printer controller 30 (e.g., an embedded processor and embedded read-only memory storing firmware for the processor) for controlling the flow of compressed swath data into the buffer 28, decompressing contents of the swath buffer 28 into uncompressed swath data, and using the uncompressed swath data to actuate the nozzles on the print head 16. The printer controller 30 also controls the paper path 20 and the shuttle mechanism 22.

The number of bytes of uncompressed data representing a full swath depends upon different parameters including printer resolution, the number of color planes (that is, the number of pintable colors), the number of pens per color plane, the number of nozzles per pen, and the length of a swath. For a printer that prints an eight inch swath at a resolution of 300 dpi and that has a tri-color print head including one pen per color plane, one column of nozzles per pen and 200 nozzles per column, the amount of uncompressed data representing a full swath will be about 1,440,000 bits/8=180 Kbytes.

The swath buffer 28 has a data storage capacity of Z bytes, which is less than the amount of uncompressed data representing a full swath. Thus, Z<Y, where Y is the number of bytes representing a full swath when the swath data is not compressed.

The actual size of the swath buffer 28 will depend upon the target rate at which the swath data is compressed. If the swath data is compressed at a target rate of X:1, the storage capacity of the swath buffer 28 may be about Z=X/Y bytes. Thus, the exemplary swath buffer may be reduced from 180 Kbytes to 60 Kbytes if the swath data is compressed at a target rate of 3:1. The type of decompression performed by the printer controller 30 will depend upon the type of compression performed by the computer 12.

Printer input/output ("I/O") is also handled by the printer controller 30. Printer I/O includes informing the host computer 12 when the swath buffer 28 has been emptied. The printer 14 communicates with the computer 12 via a bi-directional link 31.

The computer 12 includes a processor 32 and computer memory 34. Stored in the computer memory 34 is a printer driver 36, a plurality of executable instructions that, when executed, instruct the processor 32 to interpolate an image, if necessary, to match the printer resolution; and create a binary map of a dot pattern representing the interpolated image. The printer driver 36 also instructs the processor 32 to compress the binary map and send swaths (complete or partial) of the compressed map data to the printer 14.

FIG. 2 shows a method in which a dot pattern is generated by the computer 12, transmitted to the printer 14, and printed by the printer 14. First, the printer driver 36 converts an image file to a binary map representing a dot pattern (block 102). The image file is typically represented in RGB color space by n-bit words. Each n-bit word corresponds to a pixel of the image. The printer driver 36 interpolates the image file, if necessary, so that each pixel in the image is represented by at least one dot in the printed image. The total number of dots will depend upon the printer resolution, the scale of the image, parameters of the print head 16, etc. The printer driver 36 may separate the interpolated image file into separate printable color planes. For tri-color printing, the interpolated image file is separated into three color planes (e.g., cyan, magenta and yellow color planes). If the words in the image file represent red, green and blue color planes and the printable colors are cyan, magenta and yellow, the printer driver 36 will also perform translation to the cyan, magenta and yellow color components. Dither masks may then be applied to the separate color planes. Resulting from the dither masking of the planes are three dot pattern planes.

Next, the printer driver 36 determines the number of compressed rows of swath data that can fit in the swath buffer 28 of the printer 14 (block 104). The printer driver 36 is supplied with the size of the swath buffer 28 beforehand. Normally, the swath buffer 28 will be filled with data for an entire swath. However, the target rate of compression is not always going to be achieved. On occasion, the compression rate will be lower than the target rate and, consequently, the swath buffer 28 will be filled entirely with data representing only a partial swath (i.e., a reduced height swath). The computer 12 may also notify the printer 14 as to whether data representing a full swath or a partial swath will be transmitted.

The printer drive 36 starts to compress complete rows of each color plane (block 106). The rows are encoded independently of one another and may be encoded one at a time. The compression is not limited to any particular type. However, lossless compression is preferred, since lost data can reduce the quality of the printed image. Lossless compression algorithms can compress the swath data at rates between 2:1 and 3:1. One type of lossless compression algorithm that may be used is Run Length Encoding ("RLE").

If the printer driver 36 has determined that only a partial swath will be buffered, the printer driver 36 adds information to the compressed data allowing the beginning of each row to be located by the printer controller 30 (block 108). For example, the printer driver 36 may add a bit offset to each row. Adding the bit offset will allow the printer controller 30 to jump from row-to-row and reconstruct columns of uncompressed swath data. Adding the bit offset is unnecessary if the compression/decompression scheme already provides information indicating the beginning of each compressed row.

After a complete row is compressed, it is sent to the printer 14 (block 110). The printer driver 36 may interleave the rows of the three color planes or send the planes sequentially, depending upon how the printer 14 is configured. For example, the swath buffer 28 may be partitioned, with each partition storing a single color plane.

As the rows are being sent to the printer 14, the printer driver 36 keeps track of the amount of data that is being stored in the swath buffer 28. The printer driver 36 continues compressing and sending complete rows until the swath buffer size is reached or until all of the data representing a full swath has been sent (block 112).

Once the swath buffer size has been reached or a full swath has been sent, the printer driver 36 stops compressing and sending the rows and waits for a printer communication indicating that the swath buffer 28 has been emptied (block 114).

After the swath buffer 28 has been filled or after a full swath has been buffered, the printer controller 30 decompresses the contents of the swath buffer 28 and immediately uses the decompressed contents to actuate the pen nozzles 18 on the print head 16 (block 116). The contents may be decompressed column-by-column. If only a partial data swath was buffered, the printer controller 30 might use the bit offsets to jump from row to row and reconstruct the swath data column-by-column.

After all of the buffered swath data has been decompressed and used to actuate the nozzles, the printer controller 30 commands the paper path 28 to advance the sheet by the number of rows printed (block 118). If all of the rows were printed, the printer controller 30 commands the paper path 20 to advance the sheet by a nominal distance (e.g., the height of a full swath). If only 150 of 200 rows are printed, the printer controller 30 commands the paper path 20 to advance the sheet by 75% of the nominal distance.

The printer controller 30 also sends a request for a new swath (block 120). The request is sent to the computer 12.

The computer 12 receives the request (entry point A), determines the number of rows of new swath data that can fit in the swath buffer 28 (block 104), and starts compressing rows again (block 106). The printer controller 30 resumes compressing where it left off (that is, starting with row following the last row stored in the printer buffer). Thus, rows that were not printed in the previous swath will be printed in a subsequent swath. Consequently, quality of the printed image is not degraded.

The printer driver 36 continues sending swaths to the printer 14, and the printer 14 continues printing the swaths, until the entire image has been printed (block 122).

Figure 3:
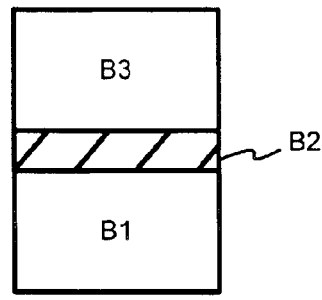
FIG. 3 is an illustration of consecutive data swaths.

The printing of a partial swath will now be described in connection with FIG. 3. A first full swath is made up of compressed rows in a first non-hatched region B1 and compressed rows in a cross-hatched region B2. The compressed rows in the first non-hatched region B1 of the first swath are transmitted to the printer 14 and printed by the printer 14. The compressed rows in the cross-hatched region B2 should have been printed but weren't because the target compression rate was not achieved. Therefore, only a partial swath is actually printed out, and the sheet is advanced by only the height of the swath that was actually printed.

The compressed rows in the cross-hatched region B2 are printed out in the next swath. If compression of the rows in the cross-hatched region B2 and a second non-hatched region B3 is performed at the target rate, a full swath including the rows in the cross-hatched and second non-hatched regions B2 and B3 is printed. Because the sheet is advanced by only the height of the swath that was actually printed, no swath data is lost. Consequently, there is no loss in quality of the printed image.

Figure 4:
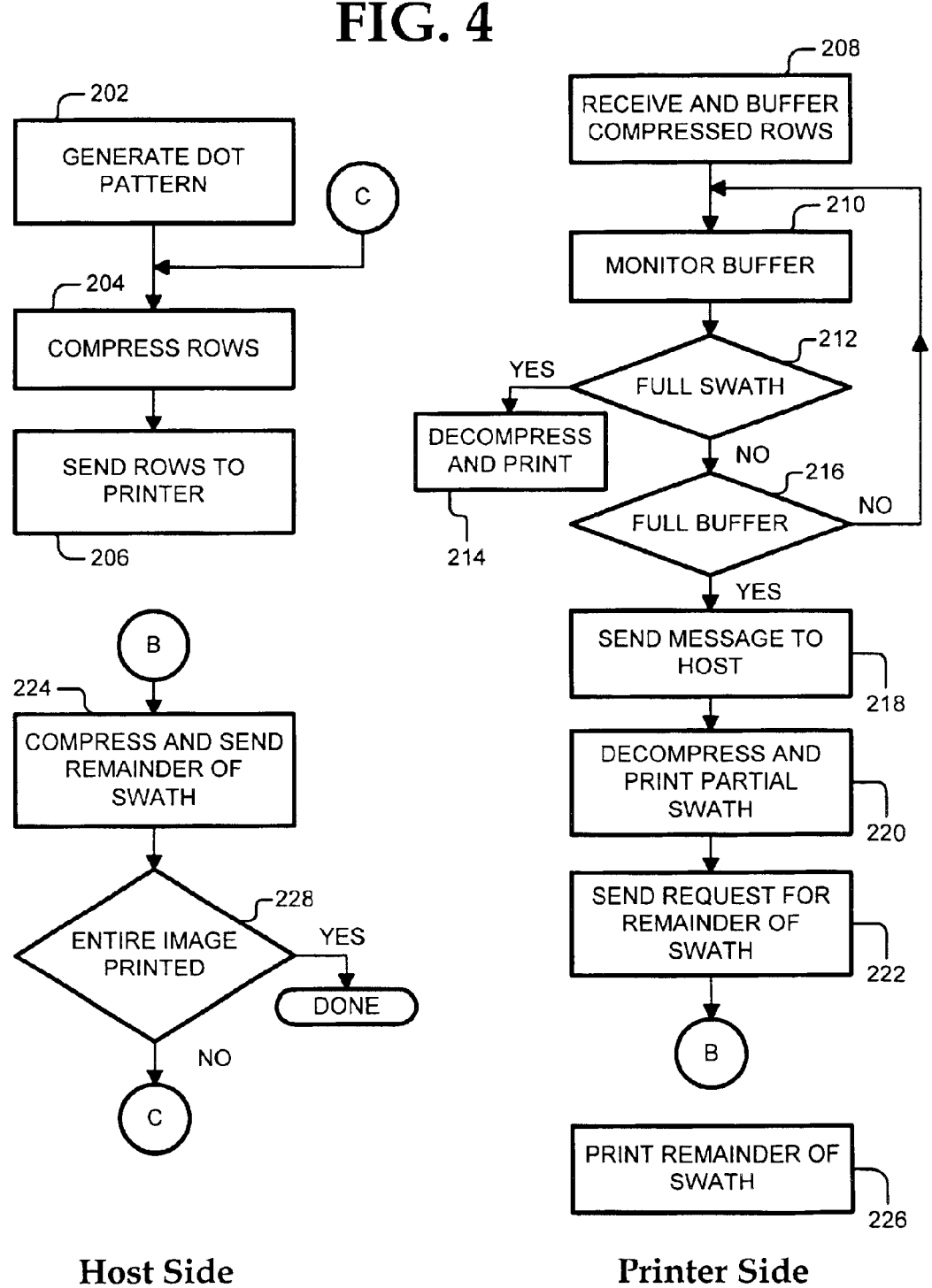
FIG. 4 is an illustration of an alternative method of generating, transmitting and printing a dot pattern.

Reference is now made to FIG. 4, which shows an alternative method of generating, transmitting, and printing a dot pattern. The printer driver 36 converts an image file to a binary map representing a dot pattern (block 202). Next, however, the printer driver 36 does not determine the number of compressed rows of swath data that can fit in the swath buffer 28; that task is performed by the printer controller 30.

The printer driver 36 starts to compress each color plane (block 204). Information is added to the compressed rows to allow the printer controller 30 to jump from row-to-row and reconstruct columns of uncompressed swath data. After a complete row is compressed, it is sent to the printer 14 (block 206).

The printer controller 30 receives and buffers the compressed rows (block 208). The printer controller 30 also monitors the swath buffer 28 to determine whether it is full (block 210). If the target rate of compression is achieved, compressed data for a full swath is buffered, the buffered data is decompressed and a full swath is printed (blocks 212 and 214).

If the target rate of compression is not achieved, the swath buffer 28 will become full before all of the compressed data for the full swath can be buffered. When the swath buffer 28 becomes full (block 216), the printer controller 30 notifies the computer 12 to stop compressing and sending rows of the swath data (block 218). The printer controller 30 also decompresses the contents of the buffer and prints a partial swath (block 220).

After the partial swath has been printed, the printer controller 30 does not command the paper path 20 to advance the sheet. Thus, the sheet is not advanced by the paper path 20. However, the printer controller 30 does request the computer 12 to send the remainder of the swath (block 222).

The computer 12 complies by compressing the remaining rows in the swath and sending the compressed rows to the printer 14 (block 224).

The printer controller 30 receives, buffers and decompresses the remaining rows, and prints out the remaining rows on a second pass (block 226). Thus, a full swath is printed in two passes.

The printer driver 36 continues sending swaths to the printer 14, and the printer 14 continues printing the swaths, until the entire image has been printed (block 228).

Two-pass printing of a full swath will now be described in connection with FIG. 3. If all compressed rows of a first full swath can fit in the swath buffer 28 (that is, all compressed rows in the first non-hatched region B1 and the cross-hatched region B2 can fit in the swath buffer 28), the full first swath is printed in a single pass. If, however, the swath buffer 28 is completely filled with the compressed rows lying only in the first non-hatched region B1, only a partial swath is printed during a first pass. After the partial swath is printed, the sheet is not advanced, and the remaining rows of the first full swath (that is, the compressed rows lying in the cross-hatched region B2) are printed out during a second pass.

The alternative method might be used if the paper path 20 can advance sheets by only the height of a full swath.

Thus disclosed is an ASIC having an embedded printer controller and an embedded swath buffer. Embedding the swath buffer on the ASIC is less expensive than providing the swath buffer in a separate package, provided that the buffer is small so as not to significantly impact the die size of the ASIC. In addition to lowering printer costs, embedding the buffer increases speed at which the printer controller can access the compressed data.

The invention is not limited to a host that is a computer. The host may be any type of machine that sends swath data to the printer. For example, the host may include a dedicated ASIC that sends swath data to the printer. Such a host may be a digital camera.

The print head is not limited to three printable colors. Any number of printable colors may be used.

The host may send uncompressed data to the printer. The printer controller may compress the swath data and store the compressed swath data in the swath buffer.

The printer may check for a full buffer, notify the host when the swath buffer is full, and advance a sheet by only the height of the swath that was actually printed. The remaining rows would be printed in a subsequent swath.

In the alternative, the host may check for a full buffer, and notify the printer that the buffer is full. The printer, in response, would print out the partial swath but not advance the sheet after the partial swath was printed. The host would then send remaining rows in the swath to the printer, and the printer would print the remainder of the swath in a second pass.

The printer is not limited to advancing a sheet by the height of a full swath if a full swath is printed. The printer may operate in a multiple pass print mode to achieve a higher print quality. Such a printer may advance a sheet by only a fraction of a swath, even if a full swath is printed.

The printer controller was described as a processor and ROM embedded in the ASIC. However, the printer controller is not so limited. For example, the printer controller may be a processor embedded in the ASIC and ROM on a separate chip. In the alternative, the processor, ROM and buffer may be on three separate chips. In yet another alternative, the printer controller may be a state machine instead of a printer and ROM.

Printer I/O was described as being performed by the printer controller. However, the printer I/O could be handled instead by an I/O module on a separate chip.

The swath buffer is not limited to any particular type of memory. For example, the swath buffer may be static random access memory ("SRAM").

The swath buffer has been described as a single buffer. However, a separate buffer may be provided for each color plane.

Actual size of the swath buffer may be adjusted to trade off cost versus performance. A larger swath buffer will be more expensive, but it will be more likely to buffer data for a full swath.

Therefore, the invention is not limited to the specific embodiments described above. Instead, the invention is construed according to the claims that follow.

What is claimed is:

1. A printer comprising:
   a buffer for storing compressed swath data, the buffer having a storage capacity of Z bytes, where Z<Y and where Y is the number of bytes of uncompressed data representing a full swath;
   a printer controller for decompressing contents of the buffer; and
   wherein the printer controller and the buffer are embedded in a single ASIC.

2. The printer of claim 1, the swath data being compressed at a target ration of X:1; wherein the buffer has a storage capacity of about Y/X bytes.

3. The printer of claim 1, further comprising a paper path; and wherein the paper path is advanced by the height of the swath that was actually printed, and wherein remaining rows are printed in a subsequent swath.

4. The printer of claim 1, further comprising a paper path, wherein the paper path is not advanced if all rows of a swath were not printed, and wherein the entire swath is printed in at least two passes.

5. The printer of claim 1, wherein each row of swath data is compressed independently of other rows of swath data, whereby the swath data is compressed one row at a time.

6. The printer of claim 1, wherein the printer controller monitors the swath buffer to determine whether the swath buffer is full and, if the swath buffer is full, outputs a message indicating that the swath buffer is full.

7. A system comprising:
   a host for generating compressed rows of swath data, compression being performed a target rate of X:1;
   a printer for receiving the compressed rows of swath data from the printer, the printer including a swath buffer for storing the compressed rows, the buffer having a storage capacity of Z bytes, where Z is about Y/X and where Y is the number of bytes of uncompressed rows representing a full swath; and
   wherein the printer further includes a printer controller for decompressing contents of the swath buffer, the printer controller and the swath buffer being embedded in a single ASIC.

8. The system of claim 7, wherein the host includes a processor and a printer driver for causing the processor to compress as many complete rows of swath data as can fit in the swath buffer, and causing the processor to output the compressed rows to the printer.

9. The system of claim 7, wherein the printer controller monitors the swath buffer to determine whether the swath buffer is full and, if the swath buffer is full, informs the host to stop transmitting compressed rows to the printer.

10. The system of claim 7, the printer further including a paper path; wherein the paper path is advanced by the height of the swath that was actually printed.

11. The system of claim 7, the printer further including a paper path; wherein the paper path is not advanced if all rows of a swath were not printed, and wherein a full swath is printed in at least two passes.

12. The system of claim 7, wherein each row of swath data is compressed independently of other rows of swath data, whereby the swath data is compressed one row at a time.

13. A method of using a printer to print a swath of an image, the method comprising the steps of:
   converting the image to a dot pattern;
   compressing complete rows of the dot pattern;
   transmitting compressed rows of the swath to the printer;
   using a swath buffer embedded in a print controller ASIC to buffer the compressed rows;
   using the printer to decompress the buffered rows; and
   using the printer to print the swath according to the decompressed rows.

14. The method of claim 13, wherein no more than a maximum number of rows is transmitted to the printer; and wherein remaining rows of the swath are compressed and transmitted to the printer after the maximum number of rows has been transmitted and decompressed.

15. The method of claim 13, further comprising the steps of monitoring the swath buffer to determine whether the swath buffer is full and, if the swath buffer is full, stopping the transmission of compressed row to the printer and allowing the printer to decompress the rows stored in the swath buffer.

16. The method of claim 13, further comprising the step of advancing a sheet by height of the swath that was actually printed.

17. The method of claim 13, wherein the dot pattern of the swath is compressed at a target rate; and wherein rows of the swath are printed in multiple passes if the target rate of compression for that swath is not achieved.

18. A printer driver for a computer and a printer, the driver comprising:
   data for causing the computer to generate a dot pattern from an image;
   data for causing the processor to determine a number of complete compressed rows that can fit in a swath buffer embedded in a print controller ASIC;
   data for causing the computer to compress the complete compressed rows that can fit in the swath buffer embedded in the print controller ASIC; and
   data for causing the computer to transmit the complete compressed rows to the swath buffer embedded in the print controller ASIC.

* * * * *